United States Patent [19]

Lange et al.

[11] 4,322,795
[45] Mar. 30, 1982

[54] CACHE MEMORY UTILIZING SELECTIVE CLEARING AND LEAST RECENTLY USED UPDATING

[75] Inventors: Ronald E. Lange; Richard J. Fisher, both of Phoenix, Ariz.

[73] Assignee: Honeywell Information Systems Inc., Phoenix, Ariz.

[21] Appl. No.: 114,854

[22] Filed: Jan. 24, 1980

[51] Int. Cl.³ .............................................. G06F 9/30
[52] U.S. Cl. .............................................. 364/200
[58] Field of Search ... 364/200 MS File, 900 MS File

[56] References Cited

U.S. PATENT DOCUMENTS

| | | | |
|---|---|---|---|
| 3,845,474 | 10/1974 | Lange et al. | 364/200 |
| 3,866,183 | 2/1975 | Lange | 364/200 |
| 3,958,228 | 5/1976 | Coombes et al. | 340/172.5 |
| 3,967,247 | 6/1976 | Andersen et al. | 364/200 |
| 4,092,713 | 5/1978 | Scheuneman | 364/200 |
| 4,195,343 | 3/1980 | Joyce | 364/200 |

Primary Examiner—Gareth D. Shaw
Assistant Examiner—Thomas M. Heckler
Attorney, Agent, or Firm—Wm. W. Holloway, Jr.; L. J. Marhoefer; N. Prasinos

[57] ABSTRACT

An apparatus is disclosed herein for providing faster memory access for a CPU by utilizing a least recently used scheme for selecting a storage location in which to store data retrieved from main memory upon a cache miss. A duplicate directory arrangement is also disclosed for selective clearing of the cache in multiprocessor systems where data in a cache becomes obsolete by virtue of a change made to the corresponding data in main memory by another processor. The advantage of higher overall speed for CPU operations is achieved because of the higher hit ratio provided by the disclosed arrangement. In the preferred embodiment, the cache utilizes: a cache store for storing data; primary and duplicate directories for identifying the data stored in the cache; a full/empty array to mark the status of the storage locations; a least recently used array to indicate where incoming data should be stored; and a control means to orchestrate all these elements.

10 Claims, 8 Drawing Figures

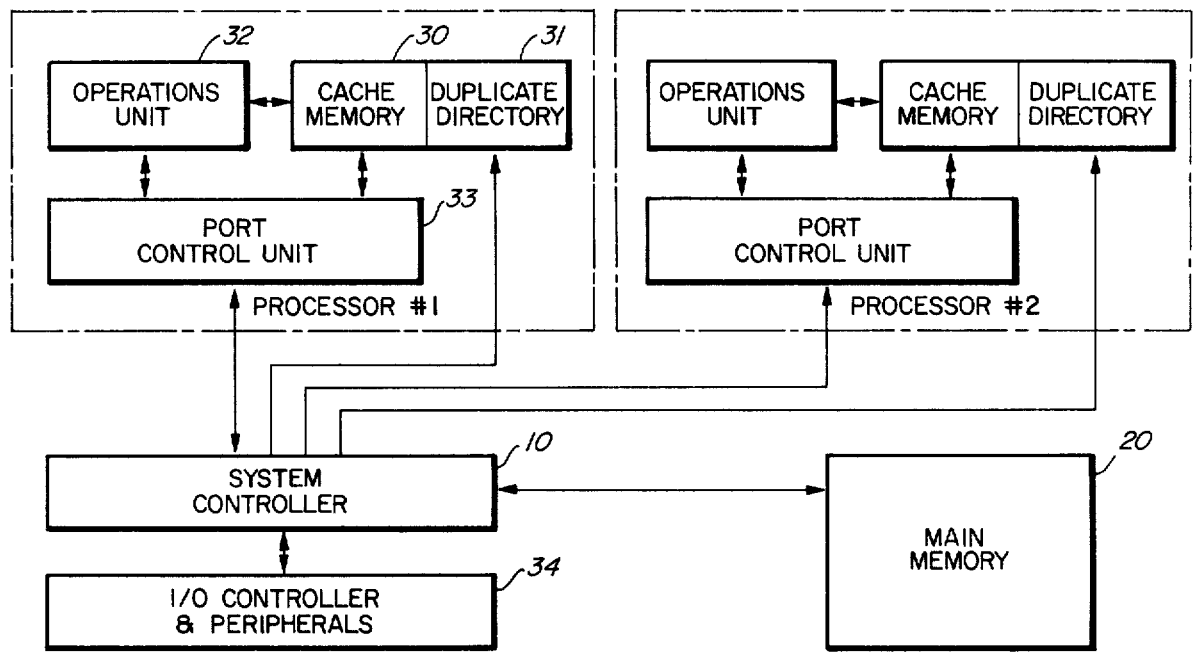
_FIG. 1_
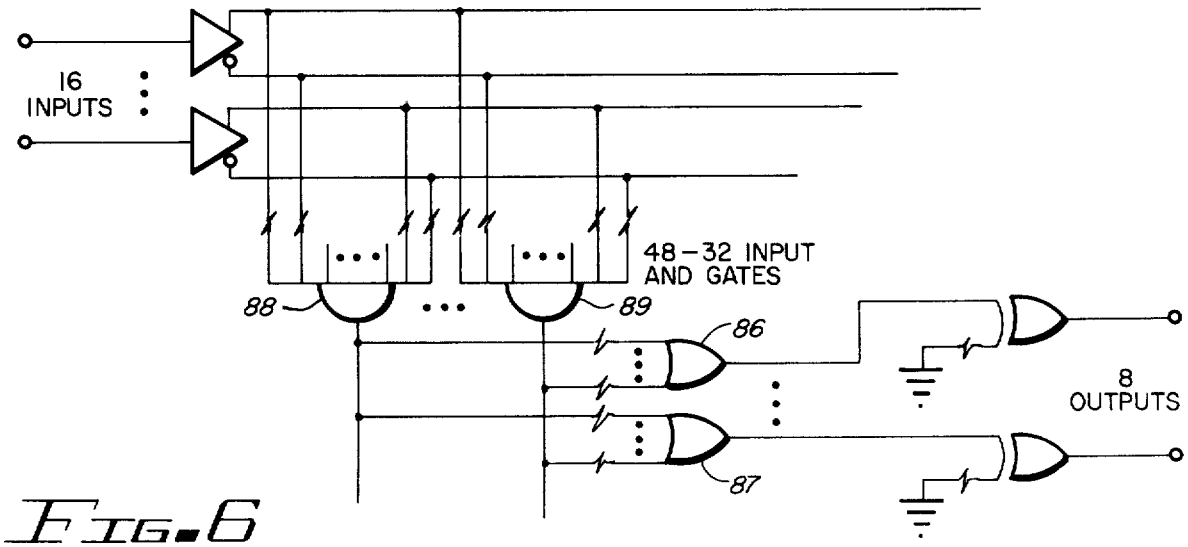
_FIG. 5_
_FIG. 6_

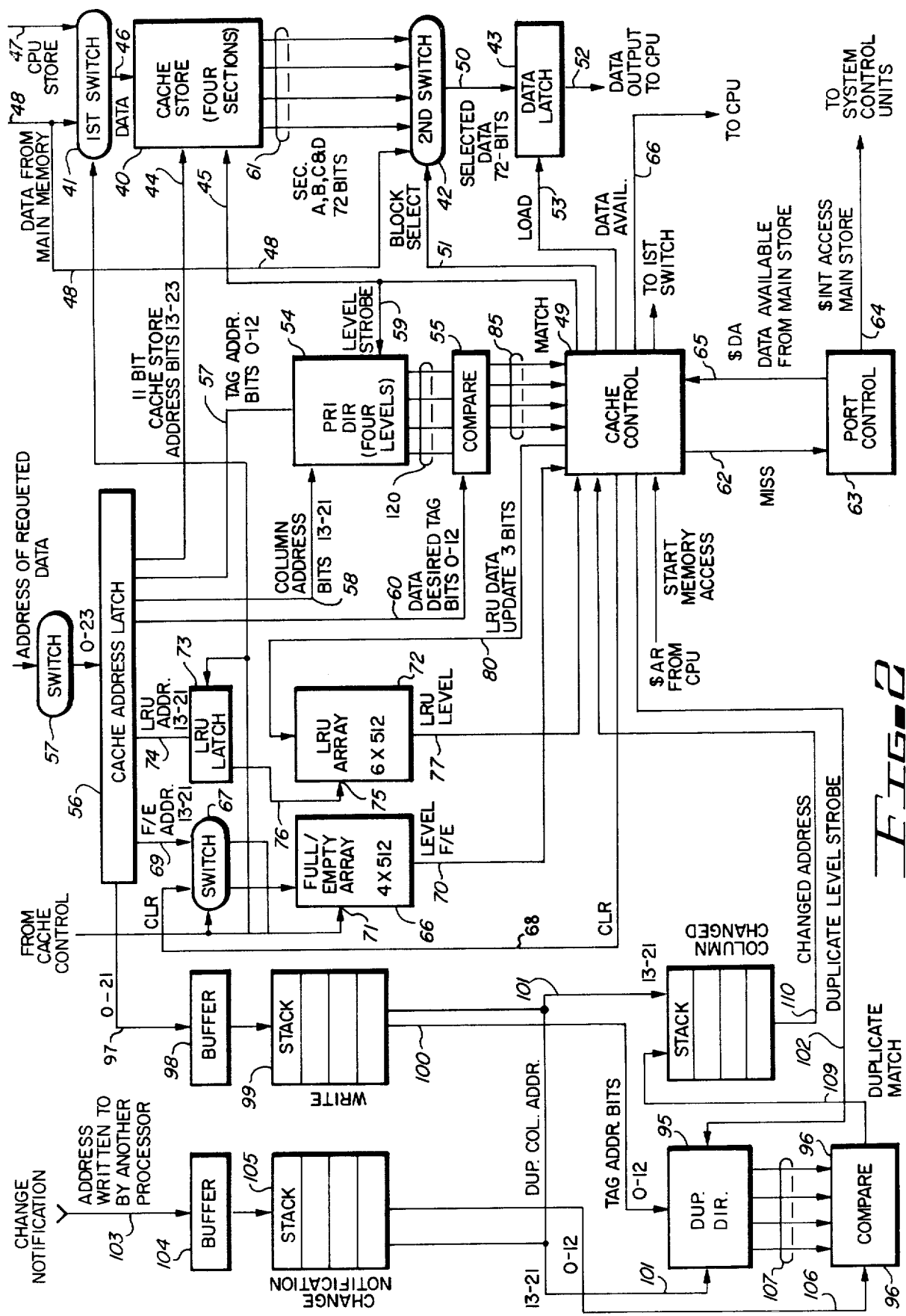

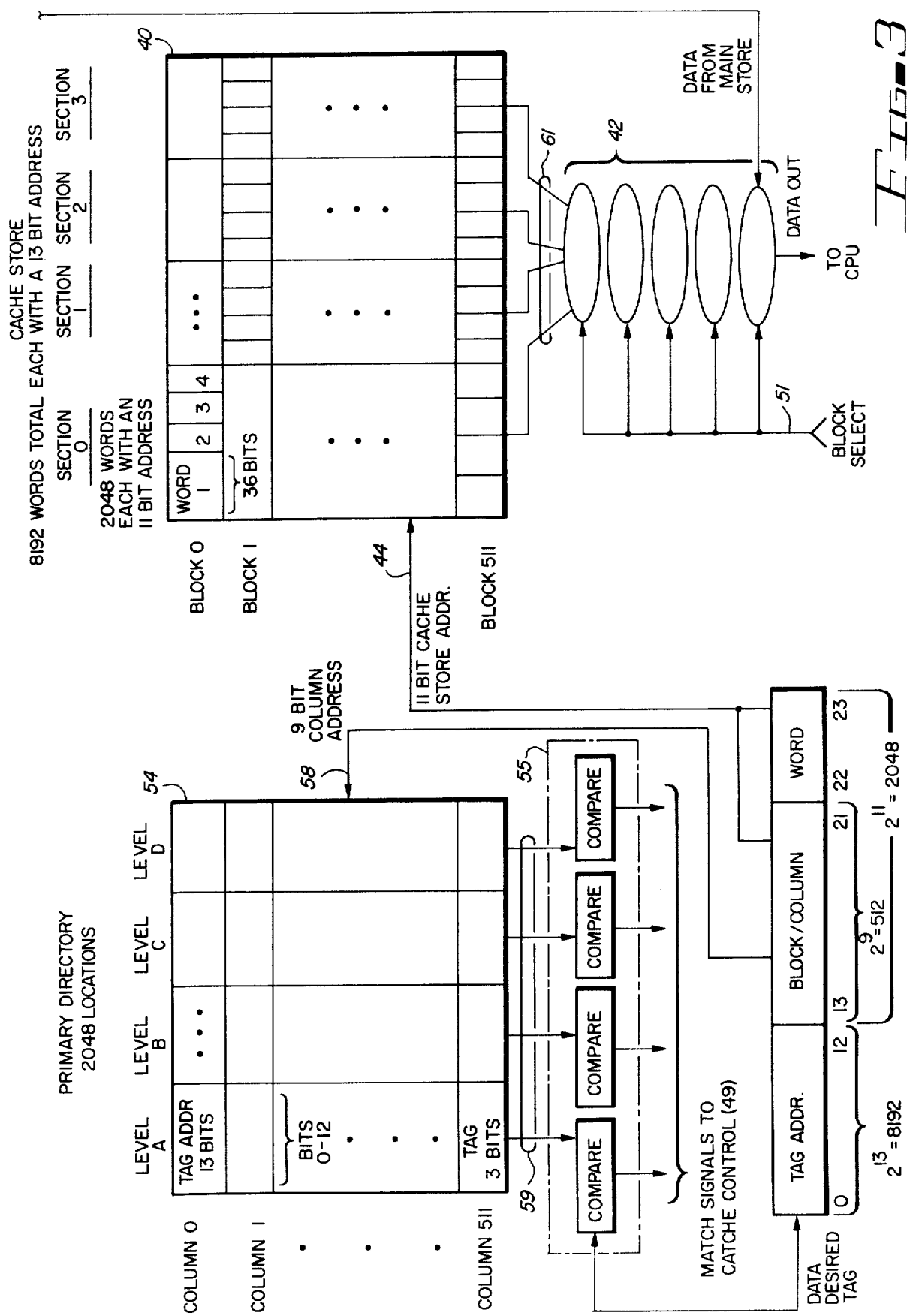

CACHE MEMORY UTILIZING SELECTIVE CLEARING AND LEAST RECENTLY USED UPDATING

BACKGROUND OF THE INVENTION

A large proportion of the operations performed by a CPU in running a program involve retrieving data from and storing data in main memory. In multiprocessor systems where several CPU are all sharing a common memory it often happens that one or more processors are forced to wait for access to main memory while another processor has the memory tied up with a read or write operation. It became apparent that overall processing speed could be improved if each processor had its own private cache of data from which it could draw information.

Thus was born the cache memory. Early versions such as described in U.S. Pat. No. 3,866,183 assigned to the assignee of the present invention adopted a "look aside" configuration in which a memory access cycle was started while the cache was checked simultaneously. Then, if the desired data was present in the cache, the memory cycle was aborted and the data was retrieved from the cache. No time was lost in this fashion in searching the cache prior to starting a memory access. The operations of the cache were called "invisible" to the CPU.

A later version described in U.S. Pat. No. 3,845,474, also assigned to the present assignee, taught a cache with clearing apparatus for use in multiprocessor systems. This cache cleared itself entirely everytime its processor entered the common operating system module shared by all the processors. Also, the entire cache was cleared each time the processor serviced an external interrupt such as when data was brought into main memory from backing store. This arrangement caused excessive clearing of the cache and slowed operations of the processor by necessitating more accesses to main memory because of a lower "hit" ratio. That is, the probability of finding the desired data in the cache was lower because of the frequency of total clearing of the cache. This reference also describes a "round robin" counter which controls cache store write operations. The first piece of data written into the cache will be stored in a first section of a particular block of the cache store, and its associated tag address bits will be stored in the corresponding first level of the corresponding column of the directory. Thereafter, each succeeding incoming piece of data will be stored in the next sequential location. Thus for a four level cache, incoming data will be stored in sections 1, 2, 3, 4, 1 . . . As is readily apparent, this scheme takes no account of the relative frequency of usage of the four levels such that the most frequently used data word in a particular row of blocks could be displaced by an incoming data word after a cache miss.

More recently a means of eliminating unnecessary clearing of the cache has been described in a patent application entitled Apparatus for Selectively Clearing a Cache Store, Ser. No. 968,223 filed on Dec. 11, 1978, now abandoned, and assigned to the present assignee. This application described an apparatus which used a duplicate directory to compare the tag addresses of the data in the cache to the tag addresses of data in main memory which had been changed by another processor in the system. If a match was found, the location of the obsolete data in cache was marked as empty. This scheme represented an advance by elimination of much unnecessary clearing of cache and, to that extent, increased the speed of operation. However, the round robin scheme of making new entries into the cache was used in this reference so the problem of displacing often used data from cache still remained unsolved.

An apparatus for hierarchical storage of data fetched from memory upon a cache miss is described in U.S. Pat. No. 3,967,247. A least recently used scheme for displacing data from the cache upon retrieval from main memory after a cache miss is described there. A two bit age tag is assigned to each of the four levels of the cache for indicating the relative times of last reference to each piece of data. After each match a network of comparators examines the level matched and the age bits from each level. The network then updates the age bits for each level using a network of adders. This algorithm is different from that of the present invention and the implementing hardware is more complicated, slower and more costly.

Thus it was that a need existed for cache memory suitable for use in a multiprocessor system which would not be completely cleared each time another processor changed a data word in main memory, and which would only displace the least recently used item in a column of data after a cache miss.

SUMMARY OF THE INVENTION

Although the invention is embodied in a complex arrangement of hardware elements, the idea is simplicity itself. Fundamentally, the idea is to increase the speed and accuracy of prior art cache memory arrangements by improving the hit ratio and selectively clearing only that information in the cache which was changed in main memory subsequent to storage in the cache. Increasing the hit ratio means increasing the proportion of access requests for data by a central processing unit which are found in the high speed cache store memory thereby making unnecessary any access to the slower main memory. Selective clearing has meaning only in a multiprocessor system where two or more central processing units are sharing a common main memory. In such a case, one CPU may update a piece of data in the main memory which is stored in the cache memory of one or more of the other CPUs in the system. Because there is no longer a correspondence between this item of data in main memory and in the cache, the obsolete data must be indicated as not present in any cache in which it is stored. Any CPU desiring to use this data is then forced to access main memory thereby receiving the most current data.

A further increase in speed is achieved by configuring the cache in a "look aside" relationship to the other units in the CPU. By "look aside" it is meant that the cache is in a relationship with the rest of the CPU such that the interrogation of the cache directory occurs simultaneously with preparation by the CPU to select a port and access main memory through that port. No delay in accessing the main memory while the cache directory is interrogated need occur with this arrangement. Indeed, where a "hit" occurs in the cache, the signal indicating this fact is used to prevent a memory access from being started at all. The effect of such an arrangement is to make the operation of the cache memory apparatus invisible to the CPU in that little or no time is lost by the CPU in retrieving data by virtue of the presence of the cache.

An increased hit ratio translates into increased speed of data retrieval by the CPU because the cache memory apparatus is constructed with faster chips than are used in main memory. This increased hit ratio is provided by use of a least recently used scheme of updating the cache and by use of a selective clearing apparatus. The problem posed by the prior art round robin counters is solved by keeping a record of the level in the cache which has been least recently used. Incoming data is then stored in that least recently used level. The hit ratio should and does increase using this scheme.

Further speed and better accuracy is provided by a selective clearing apparatus. The problem of excessive clearing is eliminated in the present invention by retaining the ideal of a selective clearing apparatus which receives the addresses of data in main memory which has been changed by another CPU and compares these addresses with the addresses of the data present in the cache store. For any match, a clear signal will be generated causing that data location in the cache store to be marked as empty in a full/empty array. This arrangement increases the hit ratio by increasing the probability that a piece of data once stored in cache is still in the cache.

In the simplest embodiment of the invention for use in a single CPU data processing system, there is a cache store means used for storing and accessing a plurality of data words used by the CPU in its operations. These data words can be instruction op codes, operands and addresses and are stored in a plurality of sections where each section is divided into a plurality of blocks.

A directory means is used to index the data that is stored in the cache store means by storing thirteen tag address bits of the absolute address identifying the location in main memory of that data. These tag address bits are stored in a location in the directory means associated with and corresponding to the particular block in which the associated data is stored. Fewer or more than thirteen bits may be used. The directory means is organized into a plurality of levels where each level corresponds to a section of the cache store means. Each level is, in turn, divided into a plurality of columns where each column corresponds to one set of blocks of the cache store means. That is, there are as many blocks in one section of the cache store as there are columns in one level of the primary directory. The number of levels in one column corresponds exactly to the number of sections in the cache store means. The purpose of the primary directory means is to store the tag address bits of each data word that is stored in the cache store means and to compare these tag address bits to the tag address bits of the absolute address of the data being requested by the CPU. A match signal is then generated when the requested data is present in the cache store means.

Finally, there is a control means for receiving and storing update data on usage of the levels of all the columns and for determining the least recently used level in the primary directory means when no match occurs. This apparatus also causes the requested information to be retrieved from main memory and supplied to the CPU upon a cache miss. At the same time that it is supplied to the CPU, the retrieved data is stored in the cache store means and its corresponding tag address bits are stored in the least recently used level of the primary directory.

In multiprocessor systems, the invention is embodied by the foregoing elements with the addition of a selective clearing apparatus. This mechanism includes a duplicate directory means organized in similar fashion to the primary directory means. Its purpose is to store the same indexed information as is stored in the primary directory and to compare these tag address bits with the tag address bits of the absolute addresses of data in main memory which has been changed by another CPU in the system. When a match is found indicating that a data word in the cache store means is now obsolete, this selective clearing apparatus will generate a clear signal which marks the location of the obsolete data as empty.

BRIEF DESCRIPTION OF THE DRAWINGS

FIG. 1 is a diagram of a two processor data processing system sharing one main memory.

FIG. 2 is a block diagram of the cache memory section of each processor.

FIG. 3 is a memory map showing the correspondence between locations in the primary directory and locations in the cache store.

FIG. 5 is a diagram illustrating the least recently used coding scheme.

FIG. 6 is a logic diagram of the FPLA chip.

FIGS. 7 & 8 are a truth table illustrating the transfer function of the FPLA chips.

DETAILED DESCRIPTION OF THE PREFERRED EMBODIMENT

Figure 4:
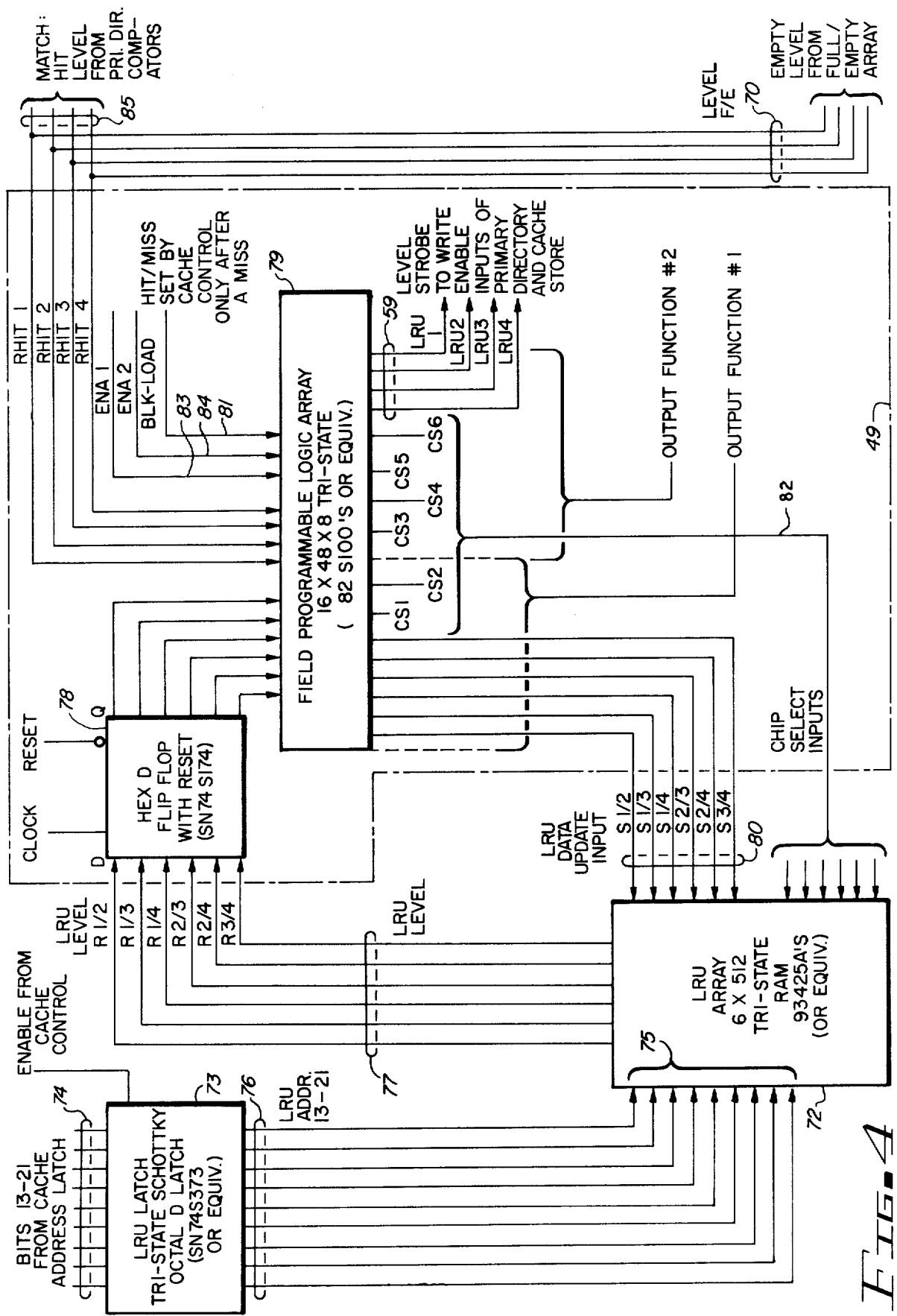
FIG. 4 is a diagram of the circuitry embodying the least recently used updating subsystem.

In today's computer systems very often multiprocessors, will be connected to a single system controller as seen in FIG. 1 in order to increase throughput. Processors number 1 and 2 are each coupled to system controller 10 which links these processors to main memory 20. Each processor also contains its own individual cache memory 30 in which it stores data, addresses and instructions which it is currently using. Associated with each cache memory is a duplicate directory 31 which serves to allow comparison between data in the cache memory of processor number 1 to data changed in memory 20 by processor 2 so that processor number 1 does not retrieve obsolete data from its cache memory but retrieves the most current version of that data from main memory 20. Each processor also has an operations unit 32 which performs arithmetic and logical operations on operands in a program. These operands are initially stored and retrieved from main memory 20, but they are written into cache memory 30 when first retrieved. Thereafter, they may be retrieved from the cache memory until the locations in which they are stored are marked empty by virtue of a selective clearing operation or until they are displaced by other data retrieved from main memory 20 as a result of a cache miss.

Each processor also has a port control unit 33 which serves to coordinate communications between the processor and main memory 20 and other input/output peripherals controlled by input/output controller 34.

A block diagram of the invention is disclosed in FIG. 2. The absolute address of the requested data as prepared by the CPU is switched into cache address latch 56 through switch 57. The core of the invention is comprised of the combination of three major subsystems. The first subsystem is used for storing and accessing the many data words used by the CPU in its operations. Cache store 40, first switch 41, second switch 42, and data latch 43 comprise the bulk of the first subsystem.

The organization of this first subsystem is as follows. Referring to FIG. 3, it is seen that cache store 40 is comprised of four sections with each section subdivided into 512 individually addressable blocks, each block containing four words. Each word is 36 bits long. Cache store 40 has an eleven bit address input for receiving the cache store address signal on line 44 comprised of bits 13 through 23 of the absolute address of the requested data. Another input shown in FIG. 2 receives the level strobe signal on line 45. This signal along with the cache store address signal determines which section and which block is to receive incoming data at data input 46.

Incoming data on line 46 passes through first switch 41 which has two inputs. Data to be stored in cache store 40 is data resulting either from a CPU store operation or a fetch from main memory after a cache miss. On CPU store operations, the data comes in on line 47 while data resulting from a main memory fetch cycle comes in on line 48. The purpose of switch 41 is to select which of these lines is to be connected to the data input of cache store 40 with selection under the control of cache control 49 via a control signal on the line marked "to first switch".

Second switch 42 has a separate data input coupled to the data output of each section of cache store 40. It also has a data input coupled to line 48 for receiving data fetched from main memory upon a cache miss. Second switch 42 has a single data output line 50 seventy-two bits wide, and a control input for receiving a block select signal on line 51 from cache control 49. The purpose of switch 42 and the function of the block select signal on line 51 is to control which of the above mentioned input lines is switched to the single output line. That is, cache control 49 can switch the seventy-two bit double word pair output of any of the four sections of cache store 40 to the output of second switch 42 if there is a hit on that particular level. If there is a miss, then the data retrieved from main memory is switched to the output of second switch 42 via line 48 and simultaneously switched to the output of first switch 41 and into cache store 40 for storage. Exactly where this data is stored in cache store 40 is controlled by the signals on lines 44 and 45 in accord with a least recently used agorithm to be explained in more detail later.

Data latch 43 has a data input coupled to line 50 from second switch 42 and a data output line 52 for presenting data to the CPU. It also has a control input coupled to the load signal on line 53 from cache control 49. The purpose of data latch 43 is to hold the data from cache store 40 or retrieved from main memory until the CPU can read it. Loading of data latch 43 is controlled by the load signal on line 53.

The second subsystem is the primary directory 54, comparator 55, and the associated circuitry required to enable these devices to accomplish their purposes. The purpose of the primary directory 54 is to store tag addresses which identify the data words in main memory which are also stored in the cache store 40. Comparator 55 serves to compare the tag addresses stored in primary directory 54 to the tag addresses of the data words asked for by the CPU and to generate match information when the requested data word is present in cache store 40. The match information indicates which level of the cache contains the requested data word.

By the phrase "level of the cache", reference is made to the overall organization of the primary directory 54 and cache store 40. As shown in FIG. 3, as the cache store 40 is divided into four sections, so also is the primary directory 54 divided into four levels. Referring to FIG. 3, it is seen that level A of primary directory 54 corresponds to section 0 of cache store 40 and so on. And, as each section of cache store 40 is divided into a plurality of blocks, so to is each level of primary directory 54 divided into a plurality of columns. Again, each column of a given level corresponds to a particular block in the corresponding section. Thus it is seen that each column of primary directory 54 has four levels each of which corresponds to a block in one of the four sections of cache store 40.

Each block stores four thirty-six bit words. In the preferred embodiment, there are 512 blocks in each section of cache store 40. Thus there are 2,048 words stored in each section and each word has an eleven bit address.

The format of the absolute address of the requested data as prepared by the CPU is illustrated in the lower left corner of FIG. 3. This absolute address is switched through switch 57 in FIG. 2 into cache address latch 56. It is stored there temporarily for use by the elements in the cache memory apparatus. Switch 57 serves to allow absolute addresses to be supplied to cache address latch 56 from other parts of the data processing system, such as a maintenance panel or a virtual unit in virtual memory mode. The most significant thirteen bits of this absolute address are the tag address bits. These thirteen bits (0-12) are sufficient to identify 8192 individual data words which is also the number of data words stored in cache store 40. The next nine bits, bits thirteen through twenty-one, serve as the block/column address. These nine bits are sufficient to identify five hundred-twelve different locations which number corresponds to the number of blocks and columns in the cache store and primary directory. The last two bits of the twenty-four bit address are bits twenty-two and twenty-three. These bits identify which word pair or which individual word is desired by the CPU. Thus, the cache address latch 56 in FIG. 2 can be thought of as divided into three portions. The first portion stores the thirteen bits of the tag address. The second and third portions store the block/column address and the two bit word designator respectively.

Primary directory 54 is loaded with tag addresses via line 57 coupling the data input of primary directory 54 to the first portion of the cache address latch 56. Cache store 40 is block loaded with four words at a time either when data is retrieved from main memory via line 48 or during CPU store operations via line 47. Data is retrieved from main memory upon a cache miss, while CPU store operations result from various program instructions. A CPU store operation involves a simultaneous transfer of a block of data into both main memory and cache store 40. During either type loading, an absolute address will have been prepared by the CPU either as the address in main memory in which to store the block of data or as the address in main memory of the data requested. As each block of data is loaded into cache store 40, the most significant thirteen bits of the absolute address for this data is simultaneously loaded into primary directory 54. The column of primary directory 54 in which this tag address is loaded is determined by the column address bits (13-21) of the absolute address stored in the second potion of cache address latch 56. These bits are supplied to the read/write address input of primary directory 54 via line 58. The level of the selected column in which the tag address is stored is controlled by cache control 49 via the level strobe signal on line 59. Likewise, the block in which the incoming data is stored in cache store 40 is controlled by the cache store address line 44 coupling the second portion of cache address latch 56 to the read-/write address input of cache store 40. The section is controlled by the level strobe signal on line 45 from cache control 49.

Retrieving data from the cache memory involves comparison of the tag address of the data requested by the CPU to the tag addresses in the primary directory 54. The second portion of cache address 56 comprises the column address of the requested data and is coupled to the read/write address input of primary directory 54 via line 58. This causes the tag addresses stored in the four levels of the selected column of the primary directory to be presented via four data output lines 120 to the first data inputs of comparator 55. The second data inputs of comparator 55 are coupled via line 60 to the first portion of cache address latch 56. Comparator 55 compares the tag address of the data desired with the tag addresses stored in the four levels of the selected column, and generates a match signal for any level upon which a match is found. These match signals are coupled to cache control 49 and are used by it to generate the block select signal on line 51. This block select signal activates the second switch 42 in such a manner that the data in the block and section corresponding to the matched level is switched from the data output of cache store 40 into data latch 43.

In the absence of any match signal from comparator 55, cache control 49 generates a miss signal on line 62. This signal tells port control 63 to generate the strobe interrupt signal on line 64 to cause main memory to retrieve the requested data. This signal goes out to the system control units which act as interface units between the CPU and the main memory.

When the data is retrieved from main memory, it appears on line 48 at the input to first switch 41. Simultaneously, it is transferred via the extension of line 48 to another data input to second switch 42. When the data has been retrieved, the signal $DA on line 65 is sent from port control 63 to cache control 49. The cache control then switches the data on line 48 through second switch 42 via the block select signal on line 51. It also causes this data to be loaded into data latch 43 via the load signal on line 53. Finally, it generates a data available signal on line 66 which tells the CPU that the requested data is not resident in data latch 43.

Now suppose that there has been a miss and that the requested data has been retrieved from main memory and is ready to store in the cache store. Its corresponding tag address is ready for storage in the primary directory. The columns in the primary directory and the cache store in which to store these two items is determined by the column address portion or second portion of the cache address latch 56. Line 58 carries the column select information to the primary directory 54 and line 44 carries the same information to cache store 40. A level in the primary directory and a section in the cache store must also be selected. The procedure implemented in the least recently used hardware subsystem is to look for any empty levels first and store the data there if an empty level is found. If there is no empty level, the cache control determines the least recently used level and displaces the data therein with the data retrieved from main memory. Statistical analysis shows that such a scheme increases the overall speed of operations of the CPU over a round robin scheme of displacement because it decreases the proportion of misses for a given number of memory accesses. Studies of computer operation on programs show that a data word which is being used more frequently than another data word has a higher probability of being used again. Since the memory chips of the cache apparatus are faster than those of the main memory, a higher hit ratio will mean faster operation.

The least recently used hardware subsystem is detailed in FIG. 4. With reference to FIGS. 2, 4 and 5, the system works as follows. The first thing cache control 49 must do is check to see whether any levels in the selected column of primary directory 54 are marked empty. To do this, it checks full/empty array 66. In the preferred embodiment, this device is a $4 \times 512$ bit random access memory array. Switch 67 has one output coupled to the address input of full/empty array 66, and another output connected to the data input of the array. Inputs to this switch consist of a full/empty address signal comprised of bits thirteen through twenty-one of the absolute address stored in the cache address latch 56. These bits from the second portion of the cache address latch are coupled to the switch by line 69. The other input to the switch is the clear signal on line 68 from the cache control. This signal consists of two portions: nine bits which designate which of the five hundred-twelve rows of the full/empty array is to be addressed; and two bits to indicate which bit in the selected row to clear. The purpose of switch 67 is to switch either the full/empty address or the clear signal to the address input of the full/empty array. The data input of the full/empty array is conditioned to clear the selected bit.

The data output of the array is the level F/E signal on line 70 coupled to cache control 49. Each row in the full/empty array 66 corresponds to one column of primary directory 54. In order to check for empty levels of a particular column, cache control 49 causes the full-/empty address on line 69 to be switched through switch 67 to address input 71 of the full/empty array. The array then presents the data in the selected row at the data output as the level F/E signal. That status of each of these four bits is then read by cache control 49 to determine whether there are any empty levels in the corresponding columns of primary directory 54. If there are, a level strobe signal on line 59 is generated to guide the tag address in the first portion of cache address latch 56 is directed via line 57 into the empty level of the column selected by the address on line 58.

If, after the above action is taken, no empty level is found, then cache control 49 reads LRU array 72 to determine the least recently level. The LRU array is a $6 \times 512$ bit random access memory array in the preferred embodiment. Its purpose is to store a plurality of bits which have encoded therein the least recently used level of each column in primary directory 54. In the preferred embodiment, there are five hundred-twelve rows with each row corresponding to a particular column in primary directory 54. The six bits in each row represent the number of combinations there are of four things taken two at a time. Each bit represents the relative time of last usage as between two of the four levels in a particular column of primary directory 54.

Referring to FIG. 5, this relative usage concept can be understood more fully. Several bit patterns representing different levels of the primary directory which have been least recently used are shown there. The first bit in any row represents the status as between levels A and B (or 1 and 2) of the primary directory and the cache store. The second bit represents the status as between levels A and C, and the third bit represents the status as between A and D, and so on. A zero in any particular bit means that the first level has been used since the second level was last used. A one represents the reverse situation. Thus in line one of the codes given, level A has been used since level B was last used, A has been used since C has last been used, A more recently than D, B more recently than C, B more recently than D, and C more recently than D. This code indicates that D is the least recently used level. The second level of code indicates that A is the least recently used level since the ones in the first three bits means that A has not been used since B or C or D has last been used.

Each time a match is found on a particular level, the code for that level will be updated to indicate it is the most recently used. To do this, the proper bit pattern will be forced into the three bits in the LRU array for the row corresponding to that column. The bit pattern stored will represent the status between the matched level and all other levels. Thus for a match on level B, a one will be forced into bit AB and a zero will be forced into bits BC and CD. This indicates that level A has not been used since level B was last used, and that level B has been used since levels C and D were last used.

The LRU bits will be updated upon a cache miss also, but the sequence of operations is slightly different. First cache control 49 reads the full/empty array to determine if there are empty levels in the selected column. If there are, the empty level is filled and the LRU code is updated to mark that level as most recently used. If there are no empty levels cache control 49 reads the LRU bits for the selected column to determine its least recently used level. When the data arrives from main memory, it will be stored in the section of cache store 40 corresponding to the least recently used level. The corresponding tag address bits will then be stored in the least recently used level of primary directory 54, and cache control 49 will update the LRU bits for the selected column to mark the level just stored as most recently used.

The hardware for the LRU system is simplicity itself. Referring to FIG. 4, the LRU latch 73 receives the LRU address signal (bits thirteen through twenty-one) from the second portion of the absolute address stored in cache address latch 56 via line 74. The LRU latch serves to hold the LRU address at the address input 75 of the LRU array 72 via line 76. The data output of the array is the LRU level signal on line 77 which is coupled to cache control 49. Cache control 49 temporarily stores the six LRU bits for the row addressed in hex flip-flop 78. Field programmable logic array 79, upon a cache miss signalled by the block-load signal on line 81, converts the six LRU bits into the level strobe signals on bus 59. However, if the level F/E signal on line 70 indicates there is an empty level, the level strobe signals on bus 59 will guide the retrieved data into the empty level. The FPLA also updates the LRU bits corresponding to the level just stored. This updating is accomplished by writing the proper bit pattern into the LRU array via the LRU data update signals on bus 80. The LRU bits for the column affected stored will then indicate that this level is most recently used. The level strobe signal on line 59 will be directed to any empty level, however, if the level F/E signal on line 70 indicates there are any empty levels. Field programmable logic array 79 is informed there has been a miss via the block load signal on line 81. This signal comes from a hit/miss flag in another part of the cache control not shown.

It is believed by the Applicant that the other parts of the cache control are obvious to those skilled in the art. Further, any arrangement of gates, flip flops and other devices which will perform the sequence of events for the system described herein will be satisfactory.

The chip select outputs on line 82 are used by the FPLA to select individual memory chips of the LRU array.

The signals enable 1 and 2 on lines 83 and 84 respectively are the chip select signals for the two individual FPLA chips which comprise the FPLA 79 in FIG. 4. These signals come from other parts of the cache control.

When there has been a match, the match signals on line 85 enter the FPLA and are converted to the proper LRU update bit pattern on line 80 to update the LRU bits for the matched level to mark it as most recently used.

FIG. 6 is a logic diagram of the internal arrangement of the FPLA chip 79. Each chip has sixteen inputs and eight outputs. Each output is the programmable OR function of up to forty-eight programmable AND functions OR gates 86 and 87 represent two of the eight forty-eight input OR gates in the chip. Each input of each OR gate is connected via a fusible link to the output of one of the forty-eight AND gates. Each AND gate has thirty-two inputs with each input connected by a fusible link to the inverted and non-inverted versions of each of the sixteen inputs. By selectively destroying certain fusible links within the FPLA, a fast and inexpensive priority network may be fabricated.

Figure 7:
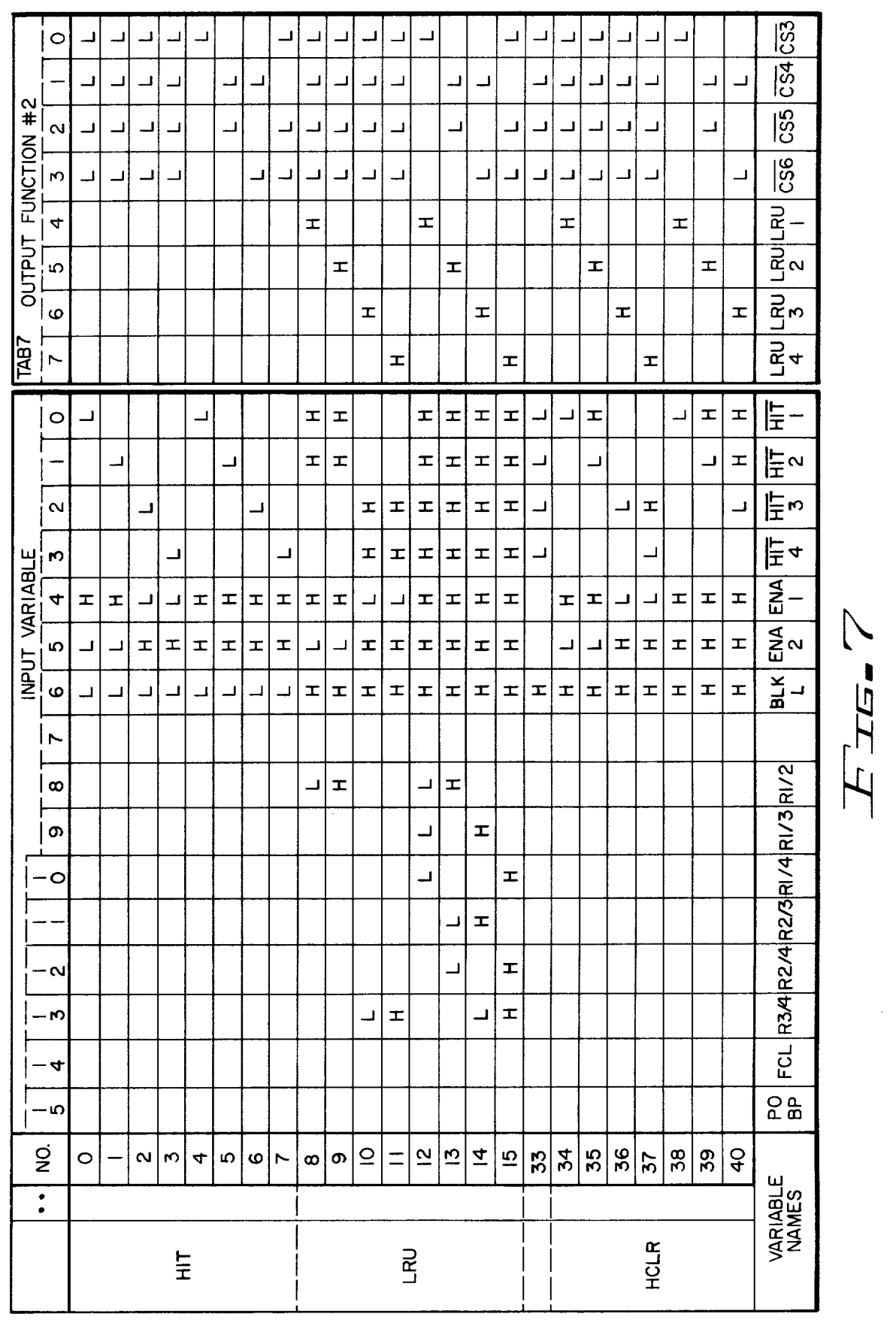
Figure 8:
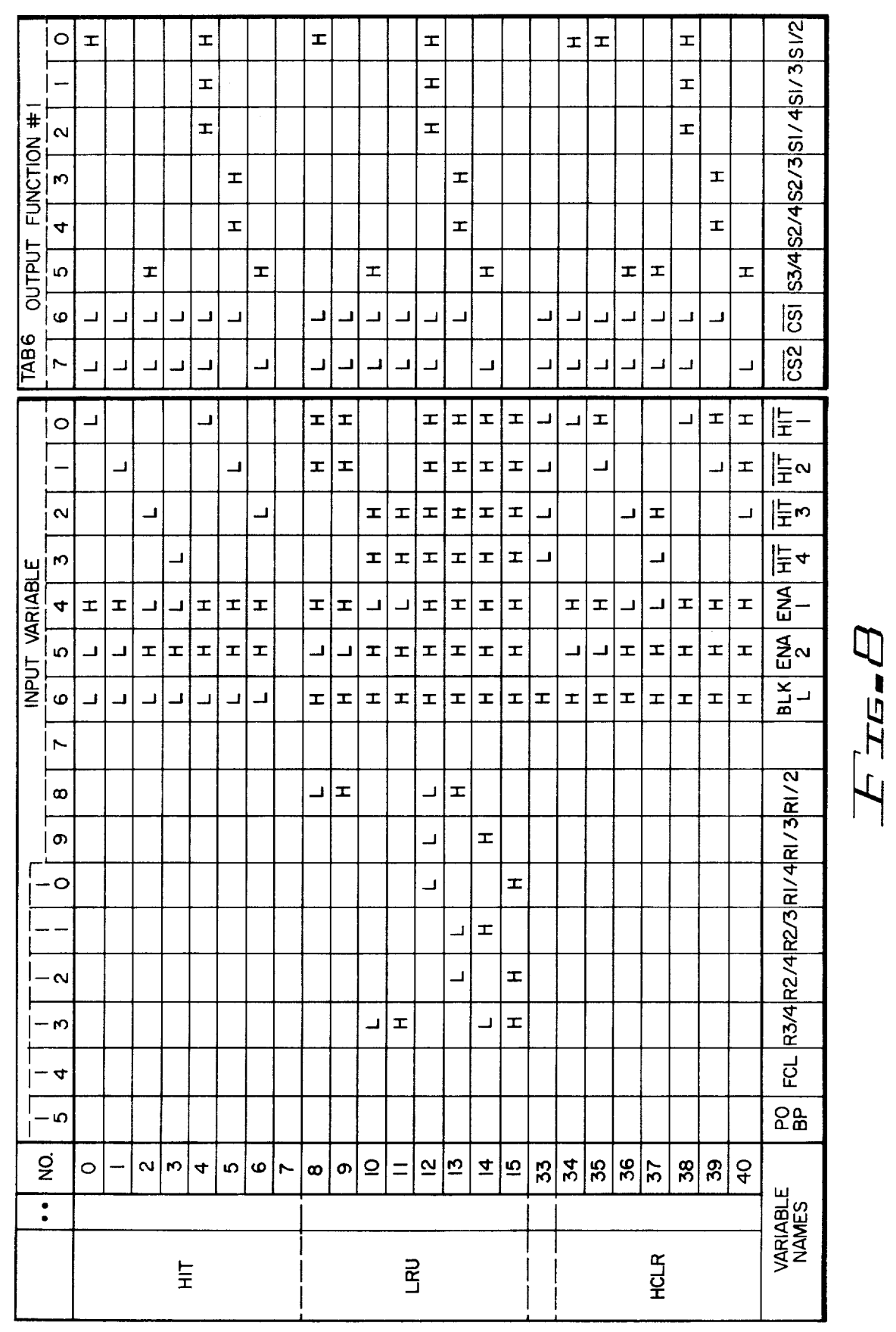

FIGS. 7 and 8 illustrate the truth table of the FPLA chips 79 in cache control 49 from which the Boolean equations used to select the links to be destroyed can be derived. The three sections to the left of the truth table in FIG. 8 labeled HIT, LRU, HCLR represent the functions which correspond respectively to processing a hit on any level, determining the least recently used level and completely clearing the cache under certain circumstances. To understand the truth table it must be understood that the cache memory is divided into two halves with levels one and two comprising the first half and levels three and four, the second half. This arrangement allows the CPU to utilize either half of the cache independently of the other so that operations may continue in the eventuality of a failure in one-half of the cache. Thus, function line zero in FIG. 8 for output function number one for a hit on level one contains only one high for the bit $S\frac{1}{2}$. The inputs for this function show that block load and enable two are in the not condition and enable one is high. Further, there has been a hit on level one as indicated by the low on the $\overline{\text{hit}}$ 1 input. This pattern of inputs indicates that the first half of the cache is in use and that there has been a hit on level one. Accordingly, the function of the FPLA chips will be to update level one as more recently used than level two. The pattern of outputs to do this is as follows. Referring to line zero on both FIGS. 7 and 8, it is seen that the output functions for the two FPLA chips are lows on all six chip selects outputs. These signals enable all memory chips of the LRU array. There is also a high on the $S\frac{1}{2}$ bit of output function number one in FIG. 8.

This high indicates that level one has been used more recently than level two and is jammed into LRU array 72 in FIG. 4 over bus 80.

Line 4 of FIGS. 7 & 8 illustrates the case where both halves of the cache are operating. Block load is low indicating that a hit has occurred, and enable one and two are both high indicating both halves of the cache are operating. The low on the hit 1 input indicates a hit on level one. The three highs on bits S½, ¼ and ¼ indicate that level one has been used since levels two, three and four have last been used. It should be noted here that in the discussion of FIG. 5 as an example of LRU coding a zero was used to indicate that one level was used since the other was last used. It is completely arbitrary whether a zero or one is selected for this condition.

Multiprocessor systems are designed for high throughput. In such arrangements, one processor in the system may change data in main memory which data is concurrently stored in the cache of one or more of the other processors. In such a case, a system error can occur if the processor with the obsolete data in its cache refers to this data in its operations. To prevent such system errors while not slowing down cache access operations, a selective clearing apparatus is used in the present invention. As noted earlier, prior art systems used clearing apparatus which would clear the entire cache under certain conditions when some data in the cache may have been made obsolete by another processor. By clearing only those locations containing obsolete data, this excessive clearing can be eliminated.

The prior art discloses a selective clearing apparatus but not in conjunction with an LRU subsystem. The selective clearing subsystem shown in FIG. 2 is comprised of duplicate directory 95, comparator 96 and their associated input and output stacks. Duplicate directory 95 is organized in the same fashion as primary directory 54. It contains duplicate tag addresses for all data stored in cache store 40. These tag addresses are loaded into duplicate directory 95 at the same time they are loaded into primary directory 54. This is accomplished by way of line 97, buffer 98 and write stack 99. Line 97 couples the first and second portions of cache address latch 56 to buffer 98. That is, it loads buffer 98 with bits 0 through 21 of the absolute address for the requested data. Buffer 98 holds this address until it can be stored in write stack 99. The write stack has two outputs for dividing each stored address into two components. The first output carries the tag address bits 0 through 12 to the data input of duplicate directory 95 via line 100. The second output carries the duplicate column address or bits 13 through 21 of the absolute address to the address input of duplicate directory 95 via line 101. The duplicate level strobe signal on line 102 from cache control 49 serves to direct the tag address bits into the correct level of the column in duplicate directory 95 selected by the duplicate column address signal on line 101.

To flag the locations of changes in data, it is necessary to know the absolute addresses of all those data items in main memory which have been changed by other processors. These change notification addresses come in on line 103 to buffer 104. These addresses are stored in change notification stack 105 so that processing of them can occur asynchronously with processing and the other parts of the cache. Change notification stack 105 has two outputs again for the purpose of dividing the address into two components. The first output on line 106 carries the tag address bits 0 through 12 of the changed address to a first data input of comparator 96. The second output on line 101 carries the column address bits 13 through 21 to the address input of duplicate directory 95. Thus, as each change notification address is processed out of stack 105, bits 13 through 21 thereof select a particular column of duplicate directory 95 for examination. The tag addresses in the four levels of that column are connected to second data inputs of comparator 96 via lines 107. The comparator compares these tag addresses with the tag address of the change notification address, and, if a match is found, the matched tag address is sent to the columns changed stack 108 as the duplicate match signal on line 109. The column changed stack 108 stores this tag address and bits 13 through 21 of the change notification address on line 101. The two components are then stored as one address. Cache control 49 reads the changed addresses via line 110, and from this information generates the clear signal on line 68. The clear signal is used to clear the bit in full/empty array 66 which corresponds to the level in primary directory 54 which points to obsolete data in cache store 40.

Although the invention has been described in terms of the particular preferred embodiment disclosed herein, it will be obvious to those skilled in the art that many variations are possible. Any of these variations which accomplish a similar purpose in a similar manner, using similar apparatus, are intended to be included within the scope of the invention disclosed herein.

What is claimed is:

1. A cache memory apparatus for a central processing unit (CPU) in a data processing system having a main memory, said CPU requesting data words stored in said main memory when required for execution of a program, comprising:

(a.) storage means for storing and accessing a plurality of data words used by said CPU, said data words stored in a plurality of sections, each section being divided into a plurality of blocks, each block storing a data word;

(b.) directory apparatus having a plurality of levels, each level corresponding to a section of said storage means, and each level divided into a plurality of columns where each column corresponds to one block of said storage means, said directory apparatus including means for storing addresses identifying data words in main memory which are stored in said storage means, said directory apparatus including means for comparing said stored addresses to addresses of data words requested by said CPU, said directory apparatus further including means for generating match information when said requested data word is present in said first means thereby indicating on which level said data was found; and (c.) control apparatus including means for causing said requested data word to be supplied from said first means to said CPU when a match occurs, said control apparatus including means for causing said requested data word to be retrieved from said main memory, said control apparatus further including means for supplying said requested data word to said CPU, and storing said requested data word in said storage means, said control apparatus including means for directing that an address indexing said retrieved data word be stored in a least recently used (LRU) level of said directory apparatus, said control apparatus also including means for generating and storing update data on a new most recently used level when a match occurs, said control apparatus generating and storing means manipulating data bits identifying least recent usage of two predetermined levels.

2. A cache memory apparatus as defined in claim 1 wherein said directing means of said control apparatus includes a random access memory LRU array divided into a plurality of rows with each row representing one column of said directory apparatus and each row comprised of a plurality of LRU bits sufficient to encode therein the order of usage in time of said levels of said corresponding column, and where each row of said LRU array can be individually addressed for reading said LRU bits or writing updated LRU bits each said LRU bit of a row representing a pair of levels of said directory apparatus where one binary state of an LRU bit means that one of said levels was used before the other, and the opposite binary state indicates the reverse situation, and where there are a sufficient number of LRU bits to represent all the possible combinations of usage of said levels of said directory apparatus.

3. A cache memory apparatus as defined in claim 2 wherein said control apparatus also includes means for receiving said match information means for reading said LRU array when a miss has occurred to determine the least recently used level of the column of said second means accessed by the address of the requested data, means for causing retrieval of said requested data from main memory, means for presenting this data for use by the CPU while simultaneously causing it to be stored in said first means in the block and section corresponding to the least recently used level of the accessed column of said second means, means for indexing the storage of said retrieved data word in said first means by storing in the previously determined least recently used level of said second means a tag address comprised of a portion of the absolute address of the retrieved data, and means for updating the LRU bits corresponding to the column of said second means in which the tag address was just stored.

4. A cache memory apparatus as defined in claim 3 wherein said control apparatus includes a field programmable logic array having a plurality of outputs, each said output being the OR combination of a programmable plurality of AND terms where each AND term is a programmable combination of a plurality of inputs and where said inputs are coupled to the data outputs of said LRU array for receiving the status of said LRU bits, said inputs receiving said match information from said directory apparatus, and wherein said outputs are coupled to data inputs of said random access memory LRU array and to write enable inputs of said second and first means, said field programmable logic array being programmed with a suitable combination of AND-OR terms to enable it to determine which said level of said directory apparatus is least recently used upon absence of a match for a requested data word and for generating a level strobe signal for directing the data word retrieved from said main memory into the proper section of said first means, said control apparatus including means for directing said tag address indexing the retrieved data word into the proper level of said second means, and, upon a match in a particular level or a miss, for generating the proper bit pattern indicating that the level stored or matched is now the most recently used level and for storing said bit pattern.

5. A cache memory apparatus as defined in claims 1 or 2 or 3 or 4 further comprising a random access memory full/empty array comprised of a plurality of rows each of said row corresponding to a column in said second means and each row comprised of a plurality of F/E bits, each said bit indicating a full or empty status corresponding to a particular level of said directory apparatus and signifying in one binary state that its associated level is full and, by the other binary state, empty, said full/empty array being responsive to clear signals generated by said third means where said control apparatus includes means for generating said clear signals to clearing to empty status the F/E bit corresponding to said level is no longer the same as the corresponding data in main memory.

6. A cache memory as defined in claim 5 wherein said means for generating said clear signals includes a duplicate directory means organized the same as said directory apparatus and containing a duplicate set of the tag addresses stored in said directory apparatus and having an input for receiving write notification addresses from other CPU's in said data processing system said write notification addresses indicating the data in those addresses in main memory has been changed, said duplicate directory means for comparing the tag addresses of the data stored in said first means to the write notification addresses and for generating said clear signals for the appropriate F/E bit corresponding to each match.

7. A cache memory apparatus in the CPU of a data processing system having a main memory, wherein said CPU requests information from said main memory when required, comprising:
  (a) a first means for storing information, wherein said first means is divided into groups of storage units called sections;
  (b) a second means having levels corresponding to said sections of said first means said second means including apparatus for identifying information stored in said first means, said second means including apparatus for comparing the information requested by said CPU to stored information and, said second means including apparatus for generating a match signal when said stored information is in said first means;
  (c) a third means for determining the least recently used level of said second means when no match occurs, said third means including apparatus for causing the requested information to be retrieved from main memory, said third means including apparatus for causing said retrieved information to be supplied to said CPU, said third means further including apparatus causing said retrieved information to be stored in said first means and identified in the least recently used level of said second means;
  (d) a fourth means having the same indexed information as said second means for determining when a piece of information stored in both main memory and in said first means has been changed in said main memory and for generating a clear signal for marking the location of said changed data in said first means as empty; and
  (e) a fifth means for indicating the full or empty status of each level of said second means and for receiving said clear signal and marking as empty the level of said second means corresponding to said changed information.

8. A cache memory apparatus for providing higher speed access to information used by a first central processing unit (CPU) than is provided by the main memory of the multiprocessor data processing system of which the first CPU is a part, comprising:

(a) a cache store means arranged in a plurality of sections each section comprised of a plurality of rows of individually addressable blocks each block having a plurality of individual addressable storage units for storing data words needed by said CPU for its operations;

(b) a primary directory arranged into a plurality of individually addressable columns, each column corresponding to a block of said cache store means, and each column arranged into a plurality of levels of tag address storage locations each level corresponding to a particular block in a row of blocks in said cache store means, each said levels for storing a tag address indicating what data words reside in the corresponding block of said cache store means and including a comparator for comparing the tag addresses of the data words stored in said cache store to the tag address of the data requested by said CPU and for generating match signals indicating in which section of said cache store, if any, said data may be found;

(c) full empty storage means for storing a plurality of individually addressable full/empty status bits each bit corresponding to a particular level of a particular column of said primary directory each of said indicator for indicating whether its corresponding level is full or empty;

(d) a selective clearing means having an address input for receiving a change notification address indicating which addresses in said main memory have been changed by another CPU in the system, and having an output for supplying a changed address signal indicating which data in said cache store has been changed in said main memory, said changed address signal to designate which of said full/empty status bits should be cleared to empty;

(e) a least recently used indicator (LRU) means including an LRU memory array comprised of a plurality of individually addressable LRU bits each said bit associated with one level of one column of said primary directory the number of said LRU bits being sufficient to encode the order of use of the levels in the associated columns of said primary directory such that the level which has been least recently used can be decoded from said LRU bits, and having an output for providing said least recently used data, and having an input for updating said LRU bits when the order of use has changed and said least recently used indicator means including a field programmable logic array comprised of a plurality of programmable AND-OR terms with inputs coupled to said LRU memory array, said full/empty status bits and to said match signals from said comparator, and with outputs coupled to said LRU memory array and to said primary directory and cache store, said field programmable logic array programmed to update said LRU bits upon a cache bit or miss and to direct the tag address of the retrieved data into either an empty level or the least most recently used level of said primary directory and the retrieved data into the corresponding section of cache store upon a cache miss;

(f) means for storing the address of information being requested by said CPU;

(g) means for comparing this address to the tag information stored in said primary directory to determine if the requested data is in said cache store;

(h) means for switching said data to said CPU if present in said cache store, and, if the data is not in said cache store, for causing said field programmable logic array to determine the least recently used level of the addressed column in said primary directory;

(i) means for causing the tag address of the requested data to be written into the level of said primary directory as directed by said field programmable logic array;

(j) means for causing the data retrieved from said main memory to be stored in the location in said cache store corresponding to the level of said primary directory just changed;

(k) means for receiving said changed address signal; and (l) means for generating from it a clear signal to clear the correct full/empty status indicator.

9. A cache memory apparatus for each CPU in a multiprocessor data processing system having a main memory comprising:

(a) a cache address latch means for receiving and holding the absolute address of the data requested by said CPU, said cache address latch means comprised of first, second and third portions, said portions for coupling portions of said absolute address to other parts of said cache memory apparatus;

(b) a cache store means for storing and accessing a plurality of pieces of information used by said CPU, said information stored in a high speed random access memory divided into a plurality of individually addressable sections, each section having a data input and output and divided into a plurality of blocks, and each block divided into a plurality of individually addressable words, said cache store means having an address input coupled to said second and third portions of said cache address latch for receiving a cache store read/write address signal for designating which block and which word of said block in which to store data coming into said data input and which word of which block to present at said data output, and having a section strobe input;

(c) a first switching means having a data output coupled to a data input of said cache store means and having a plurality of data inputs coupled to said CPU and said main memory, and having a control input, said first switching means for switching data from said CPU into said cache store means during CPU store operations and for switching data retrieved from main memory into said cache store means after a cache miss has occurred;

(d) a second switching means having a plurality of data inputs coupled to said data outputs from said sections of said cache store means, a data output and a control input, said second switching means for selecting under the control of a block select signal presented at said control input one of the data outputs from said sections of said cache store means and switching it through to said data output of said second switching means;

(e) a primary directory means having a plurality of levels each associated with and corresponding to one of said sections of said cache store means, each said level coupled to a data input which is in turn coupled to said first portion of said cache address latch and each said level divided into a plurality of individually addressable tag address storage cells with a row of said cells in each level comprising a column each said cell corresponding to one of said blocks of said cache store means and each adapted to store a plurality of tag address bits comprising tag words from said absolute address of the data stored in the corresponding block of said cache store means, each said level having an output for presentation of the tag address bits stored in a selected one of said tag cells, said primary directory means also having a directory read/write address input coupled to said second portion of said cache address latch for receiving a plurality of block address bits comprising part of said absolute address for designating which column of said tag cells to present at said level outputs, and said primary directory means having a level strobe input for receiving a signal designating which of said tag cells in a column addressed by said block address signal in which to store incoming tag words, said primary directory means for storing said tag words in said tag cells indicating what data is stored in said cache store means and where it is stored and for retrieving a selected column of said tag words and presenting them at said level outputs for comparison;

(f) a comparison means for comparing the tag address of the data requested by said CPU to the tag addresses stored in said primary directory means and for generating a match signal if a match is found, and for generating LRU (least recently used) update data, said comparison means having a plurality of inputs coupled to said level outputs for receiving said tag words and having a data desired tag word input coupled to said first portion of said cache address latch means for receiving a data desired tag word to compare against said tag words from said primary directory means and having outputs for said match signals;

(g) an LRU latch means having an LRU address input coupled to said second portion of said cache address latch means for receiving and holding the portion of said absolute address constituting said block address bit and presenting same at an output;

(h) an LRU array means for storing data encoded to indicate the least recently used level of said primary directory means, said array comprised of a plurality of rows of a plurality of storage bits, each row associated with and corresponding to one of said columns of said primary directory means and each row comprised of a sufficient number of storage bits to enable encoding of data sufficient to determine the order in time of last usage of each level in the associated column where each bit represents the status as between two of said levels and there are the same number of bits as there are combinations of the number of levels there are in said primary directory means taken two at a time, said LRU array having an address input coupled to said output of said LRU latch means for receiving the address bits designating which column in said primary directory means is being examined by said comparison means so that the storage bits of the corresponding row may be presented at an LRU level output, and having an LRU update input for receiving LRU update data to update said storage bits in the selected row when there is a match with a particular level or there is a cache miss and an empty level or the least recently used level is used to store the tag word for the data retrieved from said main memory after said miss, said updating to change said row of storage bits to indicate the matched or newly stored level is now most recently used;

(i) a control means including a field programmable logic array for controlling the elements of said cache memory apparatus and having an input coupled to said match signal output for receiving said match signal said signal indicating which, if any, of said levels of the addressed column match the address of the data requested, and having a block select output coupled to said control input of said second switching means for causing same to switch a selected one of the outputs of said levels to the output of said second switching means when said match signal occurs, and said control means having a level strobe output coupled to said level strobe input of said primary directory means and said section strobe input of said cache store means for causing said tag address bits of said absolute address in said cache address latch to be strobed into the tag cell of the least recently used level of said primary directory means when a miss occurs and for causing data being written into said cache store means either during a CPU store operation or upon retrieval from said main memory to be stored in a selected one of said sections corresponding to the level of said primary directory means in which said tag address bits corresponding to the data are stored, and having an output coupled to said first switching means for controlling whether data from said CPU or said main memory is switched into said cache store means, and said control means having a strobe address register input for receiving a signal from said CPU indicating the CPU is requesting data and has prepared the absolute address of said data, and having a miss output for signalling other elements in said data processing system that the requested data has not been found in said cache store means and to retrieve the data from said main memory, and said control means having an LRU level input for receiving data from said LRU array means for decoding into information on which level of said primary directory mans has been least recently used so that said level strobe signal can be prepared utilizing this information.

10. A cache memory apparatus as defined in claim 9 further comprising:

(a) a full/empty array means comprised of a plurality of individually addressable rows of F/E bits each row associated with and corresponding to one of said columns in said primary directory means and each said data storage cell corresponding to one of said levels in said corresponding column with the binary state of each said F/E bit indicating the full or empty status of each corresponding level, said full/empty array means having an address input for receiving an F/E address signal for accessing said rows and having a data input for receiving a signal for setting or clearing each said F/E data bit in the accessed row;

(b) a third switching means having a first input coupled to said second portion of said cache address latch for receiving said F/E address signal, and having an output coupled to said address input of said LRU array for passing said F/E address signal thereto upon receipt of a predetermined control signal at a control input, and having a clear input coupled to said control means for receiving a signal clearing selected ones of said F/E bits in the row addressed by said F/E address;

(c) a change notification stack means for receiving the absolute change notification addresses of locations in said main memory which have been changed by other processors in said data processing system since last written into said cache store, and having a first output coupled to a tag word portion of each said change notification address, and a second output coupled to a block address portion of said change notification address;

(d) a write stack means for storing portions of the absolute addresses of data stored in said cache store means and having an input coupled to said first and second portions of said cache address latch means for receiving said portions for storage and having a first output for presenting said first portion of said absolute address, and having a second output for presenting said second portion;

(e) a duplicate directory means organized in the same fashion as said primary directory means and storing a duplicate set of tag words corresponding to the data stored in said cache store, and having a tag word input coupled to said first output of said write stack means for receiving and storing tag words simultaneously with said primary directory means, and having a duplicate column address input coupled to said second output of said write stack means and said change notification stack means for receiving said second portion of said absolute address in said cache address latch means for accessing the correct column when data is being stored in said cache store means and for receiving said second portion of said change notification address to access the correct column to read a selected tag word therein when the tag words of the data stored in said cache store means are compared to the tag words of data in main memory which has been changed, and said duplicate directory means having a duplicate level strobe input coupled to said control means for receiving a signal indicating which level of said accessed column to write to or read from, and having an output for each said level for presenting the tag word stored in that level of the accessed column;

(f) a second comparison means having a plurality of inputs coupled to each said level output of said duplicate directory means and having a change tag input coupled to said first output of said change notification stack means for comparing the tag word of said change notification address to the tag words in the accessed column of said duplicate directory means, and for generating a duplicate match signal at an output when a match is found indicating on which level the match occurred, if any;

(g) a column changed stack means having an input coupled to said second output of said change notification stack means for receiving said second portion of said change notification address and having an input coupled to said comparison means for receiving said duplicate match signal for causing said second portion of said change notification address to be stored along with said duplicate match signal, and having an output for presenting said stored signals;

(h) means included in said control means coupled to said output from said column changed stack means and coupled to said clear input of said third switching means for generating a clear signal which indicates which data storage cell of which row of said full/empty array means to clear to empty status;

(i) means included in said third switching means for causing the portion of said clear signal indicating the desired row to be switched to said address input of said full/empty array means and for causing the portion of said clear signal indicating which data storage cell to clear to be switched to said data input;

(j) a field programmable logic array in said control means coupled to a data output of said full/empty array means and having an output coupled to said level strobe signal line and programmed to cause data retrieved on a cache miss and tag words for that data to be stored first in empty levels and sections of said primary directory means and said cache store means, and then if there are no empty levels, then into the least recently used level.

* * * * *